United States Patent
Nagai et al.

(10) Patent No.: US 9,086,165 B2
(45) Date of Patent: Jul. 21, 2015

(54) GATE VALVE IN WHICH AMOUNT OF SQUEEZE OF SEALING MATERIAL IS CONTROLLABLE

(71) Applicant: V-Tex Corporation, Shinagawa-ku, Tokyo (JP)

(72) Inventors: Hideaki Nagai, Hitachinaka (JP);
Shuichi Araki, Hitachinaka (JP);
Takayuki Tadokoro, Hitachinaka (JP);
Naomichi Yamaguchi, Hitachinaka (JP)

(73) Assignee: V-Tex Corporation, Tokyo (JP)

( * ) Notice: Subject to any disclaimer, the term of this patent is extended or adjusted under 35 U.S.C. 154(b) by 177 days.

(21) Appl. No.: 13/870,810

(22) Filed: Apr. 25, 2013

(65) Prior Publication Data
US 2013/0306896 A1  Nov. 21, 2013

(30) Foreign Application Priority Data
Apr. 27, 2012 (JP) .................................. 2012-103177

(51) Int. Cl.
| F16K 31/02 | (2006.01) |
| F16K 25/00 | (2006.01) |
| F16K 39/04 | (2006.01) |
| F16K 3/18  | (2006.01) |
| F16K 51/02 | (2006.01) |
| F16K 3/02  | (2006.01) |

(52) U.S. Cl.
CPC ................ *F16K 25/00* (2013.01); *F16K 3/0254* (2013.01); *F16K 3/18* (2013.01); *F16K 39/04* (2013.01); *F16K 51/02* (2013.01)

(58) Field of Classification Search
CPC .................................. F16K 3/18; F16K 31/046
USPC .......... 251/129.04, 129.11–129.13, 157, 158, 251/193
See application file for complete search history.

(56) References Cited

U.S. PATENT DOCUMENTS

| 7,896,313 B2    | 3/2011  | Ishigaki |
| 2006/0033065 A1* | 2/2006  | Duelli et al. ................. 251/193 |
| 2007/0278437 A1* | 12/2007 | Takaiwa ................... 251/129.11 |

FOREIGN PATENT DOCUMENTS

| JP | 2007-309337 A | 11/2007 |
| JP | 2009-24787 A  | 2/2009  |

* cited by examiner

*Primary Examiner* — John K Fristoe, Jr.
*Assistant Examiner* — Hailey K Do
(74) *Attorney, Agent, or Firm* — Crowell & Moring LLP

(57) ABSTRACT

{Technical Problem}
To provide a gate valve that can control the amount of squeeze of sealing material according to each of situations, that is, under the in-manufacturing or during vacuum-maintaining state; thereby, the invented gate valve is capable of suppressing deterioration of its sealing material and lengthening the service life of the sealing material used therein.
{Solution to Problem}
The gate valve 100 of the embodiment has the control device 11, which is comprised of the equipment control unit 12 that transmits an instruction either an in-manufacturing CLOSE instruction or a FULL CLOSE instruction and the storage means 13 that stores position date that corresponds to each of such instructions. The control device 11 receives either of such instructions and generates the position signal referring to the corresponding position data. The servo motor 4 of the driving device 2 receives the position signal and the rotative force of the servo motor 4, which corresponds to the received position signal, is translated into the movement of the activator 5. The sealing material 3 on the gate 1 is pressed against the valve seat 101 by the gate 1 driven according to each of the instructions and is maintained in the squeezed state.

10 Claims, 11 Drawing Sheets

FIG. 2
(a)
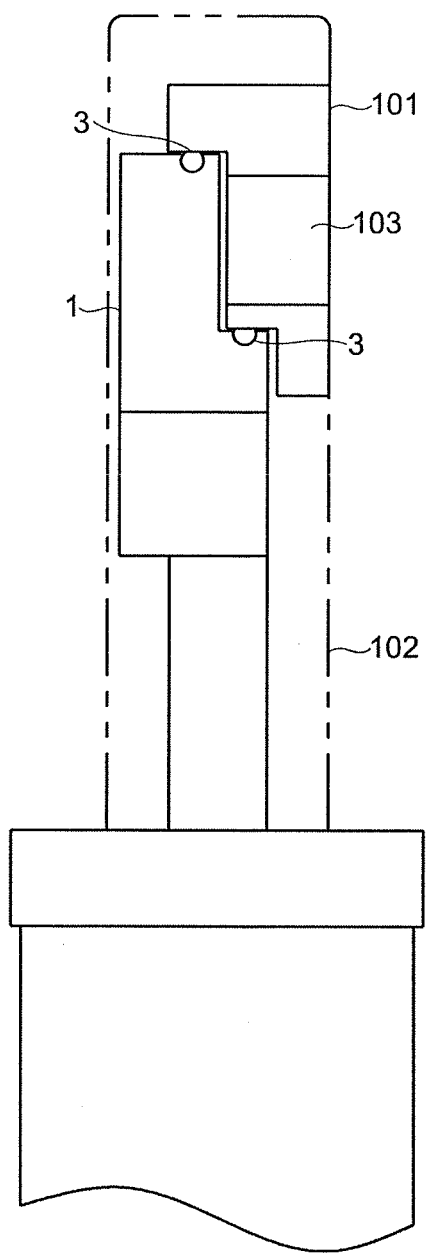
(b)
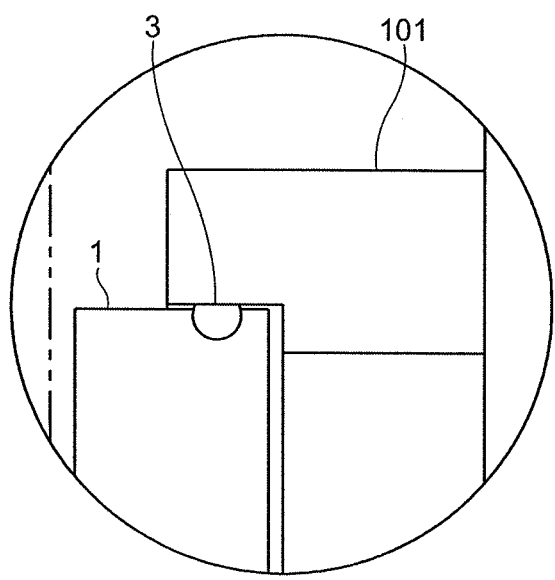

FIG. 3
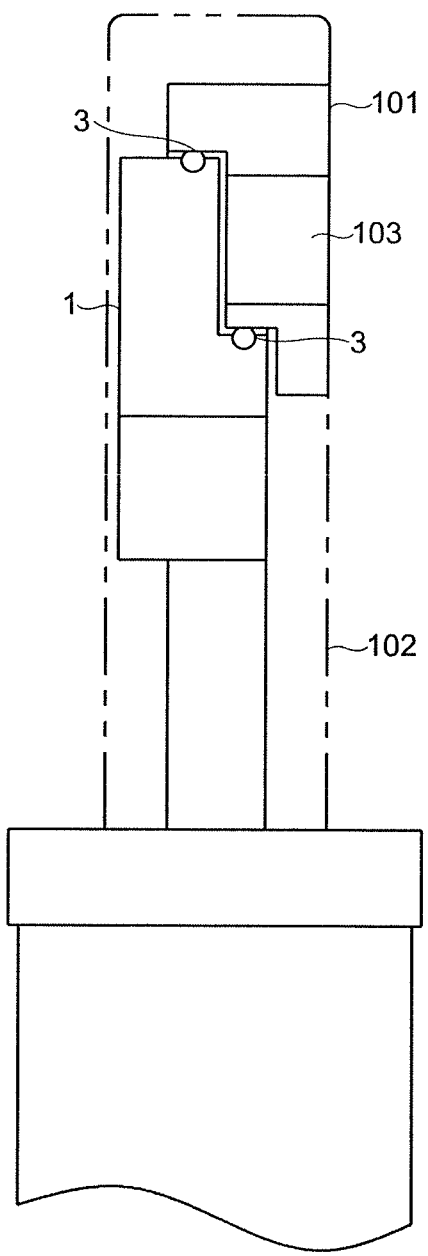
(a)
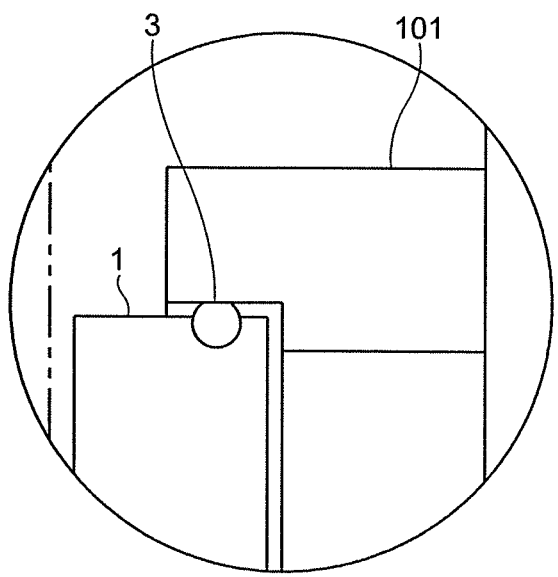
(b)

FIG. 4
(a)
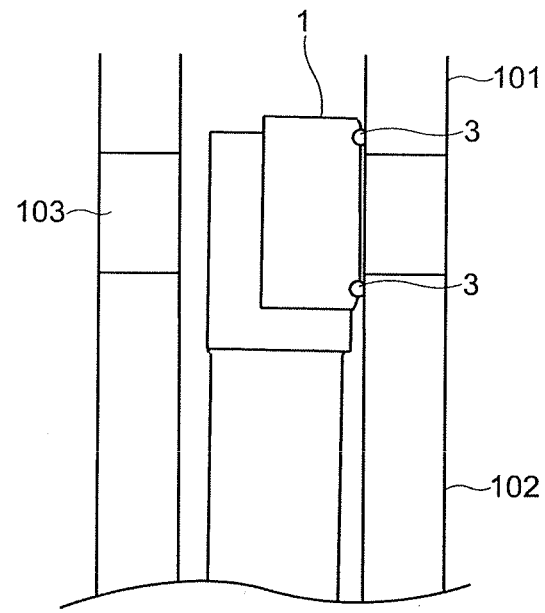
(b)
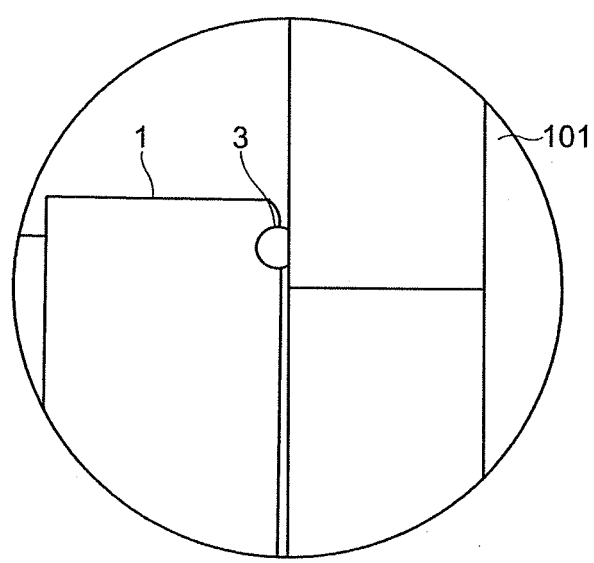

FIG. 5
(a)
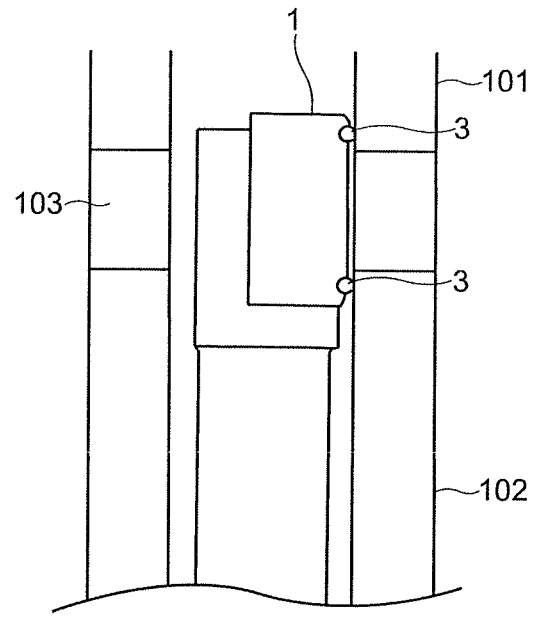
(b)
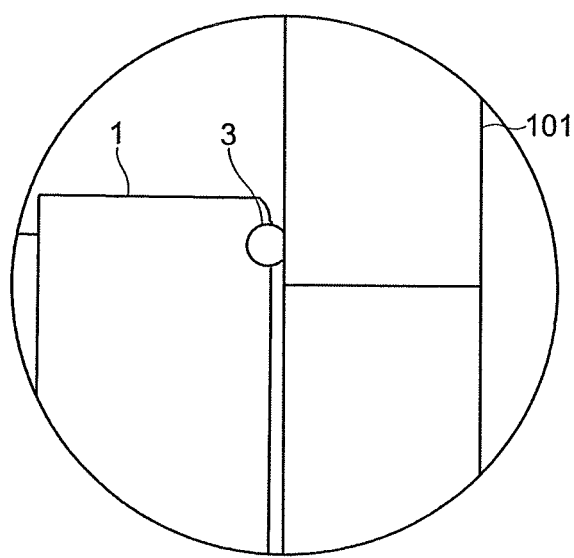

LAST OPERATION FEEDBACK TORQUE

GATE VALVE IN WHICH AMOUNT OF SQUEEZE OF SEALING MATERIAL IS CONTROLLABLE

TECHNICAL FIELD

The present invention relates to a gate valve that electrically opens and closes. The invention is applicable particularly to a gate valve in which the amount of squeeze of sealing material is controllable.

BACKGROUND ART

To date, gate valves of various types of mechanisms have been proposed for use in maintaining the vacuum of a vacuum chamber of such as semiconductor manufacturing equipment.

For example, Patent literature 1 describes a gate valve. The gate valve described there has a housing having a gas passage. The housing accommodates a round-shaped valve plate (valve body); and to the housing, a driving device is attached. The driving device has a shaft that connects to the valve plate and an actuator that drives the shaft. The driving device linearly moves the valve plate to open or close the gas passage. The gate valve in that disclosure is, for instance, installed between a vacuum chamber and a vacuum pump in a semiconductor manufacturing equipment and opens or closes the gas passage between the vacuum chamber and the vacuum pump. This means that the gate valve described in Patent literature 1 electrically opens or closes. The literature further mentions that the actuator may be constituted of an electric motor, a ball screw that is rotated by the electric motor, and a ball screw nut that engages with the ball screw.

Further, Patent literature 2 describes another gate valve. The valve described there is comprised of a valve body (housing); a gate assembly accommodated in the valve body, wherein the gate assembly opens and closes openings formed on the valve body confronting each other; a first cylinder that is a first driving device for open and close movements of the gate assembly; and a second cylinder that is a second driving device for a sealing movement of the gate assembly, wherein the valve body has an opening. This gate valve is controlled by a control device of a system so that the open and close movements and the sealing movement of the gate assembly will be taken place independently each other by the first cylinder and the second cylinder. Each of these cylinders is designed to be fed with compressed air from an air source and thereby its cylinder rod is driven. The literature further mentions that a seal ring (a sealing material) such as an O-ring is provided on the gate assembly.

In each of the gate valves described in the patent literatures cited above, the valve body is arranged confronting the valve seat in the valve body. In this configuration, the driving device drives the valve body toward the valve seat and the valve body presses the sealing material against the valve seat to make the sealing material squeezed; and thereby the airtightness between the inside and outside of the valve body and the valve seat is secured. Hereunder, securing an airtight state is referred to simply as "sealing".

LITERATURE OF RELATED ART

Patent Literature

{Patent literature 1} Japanese Patent Application Laid-open, No. 2009-24787

{Patent literature 2} Japanese Patent Application Laid-open, No. 2007-309337

SUMMARY OF INVENTION

Technical Problem

When a manufacturing equipment that uses above stated gate valve is in the state of the manufacturing of a product (hereinafter this state is referred to as "in-manufacturing"), it is enough to shut a leakage of only a process gas into a vacuum chamber through the gate valve. Therefore, the amount of squeeze of the sealing material during the in-manufacturing can be reduced more than the amount for maintaining vacuum of a vacuum chamber. With this, the reduced amount of squeezing of a sealing material during the in-manufacturing will suppress the deterioration of the sealing material and lengthens its service life.

In the gate valves of above stated patent literatures however, the amount of squeeze of the sealing material is not controlled whether under the in-manufacturing. As a result, the amount of squeezing of the sealing material is forced to be an amount that the maintaining of a vacuum chamber to a vacuum state requires, even under the in-manufacturing. Thus, the deterioration of the sealing material is not suppressed and consequently the service life of sealing material will not lengthen.

An object of the present invention is to provide a gate valve that can control the amount of squeeze of sealing material according to each of situations, that is, under the in-manufacturing or during vacuum-maintaining state, and thereby, can suppress the deterioration of its sealing material and lengthening the service life of the sealing material used therein.

Means for Solving Technical Problem

The gate valve of the present invention is a gate valve comprising
 a valve seat,
 a valve body arranged confronting the valve seat,
 a sealing material,
 a driving device that drives the valve body to the valve seat to press the sealing material against the valve seat so that the sealing material will be squeezed to establish sealing, and
 a control device connected to the driving device,
 wherein the gate valve is characterized in that
 the driving device is comprised of
 a servo motor and
 an actuator connected to the valve body to drive the valve body by applying linear-motion force generated by translating rotative force from the servo motor, and
 the control device is comprised of
 an equipment control unit that transmits an instruction either an in-manufacturing CLOSE instruction or a FULL CLOSE instruction according to determination by a related manufacturing equipment and
 a storage means that stores an in-manufacturing CLOSE position data and a FULL CLOSE position data,
 wherein
 the control device
 receives an instruction either the in-manufacturing CLOSE instruction or the FULL CLOSE instruction according to determination by the related manufacturing equipment from the equipment control unit and
 generates an in-manufacturing CLOSE position signal or a FULL CLOSE position signal referring to the in-manufacturing CLOSE position data or the FULL CLOSE position data stored in the storage means, and the servo motor receives said in-manufacturing CLOSE position signal or said FULL CLOSE position signal, and the rotative force of the servo motor that corresponds to the received signal is translated into the movement of the actuator, and the sealing material is pressed against the valve seat by the movement of the valve body caused according to the in-manufacturing CLOSE instruction or the FULL CLOSE instruction and is maintained being squeezed.

The gate valve of the present invention is the gate valve characterized further in that the state of squeeze of the sealing material at a FULL CLOSE position is large in the amount of squeeze and the state of squeeze of the sealing material at an in-manufacturing CLOSE position is controlled to an amount of squeeze smaller than that in the FULL CLOSE position by the movement of the actuator that moves in the opening direction from the FULL CLOSE position.

The gate valve of the present invention is the gate valve characterized further in that;

when the control device receives a FULL OPEN initialization instruction from the equipment control unit and generates a FULL OPEN initialization signal, and the servo motor receives the FULL OPEN initialization signal, and the rotative force of the servo motor that corresponds to the received signal is translated into a movement of the actuator, and the valve body is driven to the home position of drive of the valve body at a uniform speed and is pressed on the home position of drive at a torque more than the predetermined torque for a predetermined length of time continuously, then the position of the valve body is stored in the storage means as a FULL OPEN position data;

and when the control device receives a FULL CLOSE initialization instruction from the equipment control unit and generates a FULL CLOSE initialization signal, and the servo motor receives the FULL CLOSE initialization signal, and the rotative force of the servo motor that corresponds to the received signal is translated into a movement of the actuator, and the valve body under being pressed is driven to the valve seat at a uniform speed and presses the sealing material at a torque that gives a predetermined amount of squeeze, and the sealing material under being pressed is pressed at a torque more than the torque that gives the predetermined amount of squeeze for a predetermined length of time continuously, then the position of the valve body is stored in the storage means as the FULL CLOSE position data; and the position, the amount of squeeze of said sealing material at which is a prearranged less amount smaller than the predetermined amount of squeeze, is stored in the storage means as the in-manufacturing CLOSE position data, and the distance from the FULL OPEN position to the FULL CLOSE position is stored in the storage means as a drive amount of the valve body.

The gate valve of the present invention is characterized further in that the amount of squeeze of the sealing material at the FULL CLOSE position is not less than 0.35 mm and the amount of squeeze of the sealing material at the in-manufacturing CLOSE position is not larger than 0.35 mm.

The gate valve of the present invention is characterized further in that the amount of squeeze of the sealing material at the FULL CLOSE position is 0.35 mm.

The gate valve of the present invention is characterized further in that the amount of squeeze of the sealing material at the in-manufacturing CLOSE position is 0.25 mm.

The gate valve of the present invention is characterized further in that the control device switches to the FULL CLOSE position signal, when any of the instructions from the equipment control unit is not received in predetermined time limit while the sealing material is pressed against the valve seal and maintained in the squeezed state by the movement of the valve body caused in response to an in-manufacturing CLOSE position instruction.

The gate valve of the present invention is characterized further in that the predetermined time limit for the state that no instructions are received from the equipment control unit is four seconds or more.

The gate valve of the present invention is characterized further in that the control device has a storage means and an instructing means for actions against abnormality, wherein the storage means stores, in advance, a time course behaviors of a feedback torque waveform and a gate valve opening waveform both at the time of the last operation of the gate valve as a feedback torque waveforms, and the instructing means for actions against abnormality compares a feedback torque waveform searched by the time course behaviors of the feedback torque waveform and the gate valve opening waveform both at the time of the last operation of the gate valve with a feedback torque waveform generated from the time course behaviors of a currently measured feedback waveform at the time of operation of the gate valve and a currently measured gate valve opening waveform to examine the identity of waveforms, and, when waveforms are judged not identical, the instructing means for actions against abnormality reverses the rotation direction specified in the instruction of the rotation direction of the rotative force of the servo motor so that the servo motor will make a predetermined number of times of reverse rotation and thereafter will stop.

The gate valve of the present invention is characterized further in that the control device has an image display device that displays the feedback torque waveform at the time of the last operation stored in the storage means and the currently measured feedback torque waveform on the screen in the superimposition manner in terms of the time course.

Advantageous Effects of Invention

Being configured as stated above, the gate valve of the present invention can control the amount of squeeze of sealing material according to each of situations, that is, under the in-manufacturing or during vacuum-maintaining state, and thereby, can suppress the deterioration of its sealing material and lengthens the service life of the sealing material used therein.

BRIEF DESCRIPTION OF DRAWINGS

FIG. 2 This is a partial cross sectional view to illustrate a squeeze state of the sealing material of the gate valve of an embodiment of the present invention in the in-manufacturing CLOSE state.

FIG. 3 This is a partial cross sectional view to illustrate a squeeze state of the sealing material of the gate valve in an embodiment of the present invention in the FULL CLOSE state.

FIG. 4 This is a partial cross sectional view to illustrate a squeeze state of the sealing material of the gate valve in another embodiment of the present invention in the in-manufacturing CLOSE state.

FIG. 5 This is a partial cross sectional view to illustrate a squeeze state of the sealing material of the gate valve in another embodiment of the present invention in the FULL CLOSE state.

MODES FOR IMPLEMENTING INVENTION

The following describes embodiments of the present invention referring to drawings.

Embodiment 1

Figure 1:
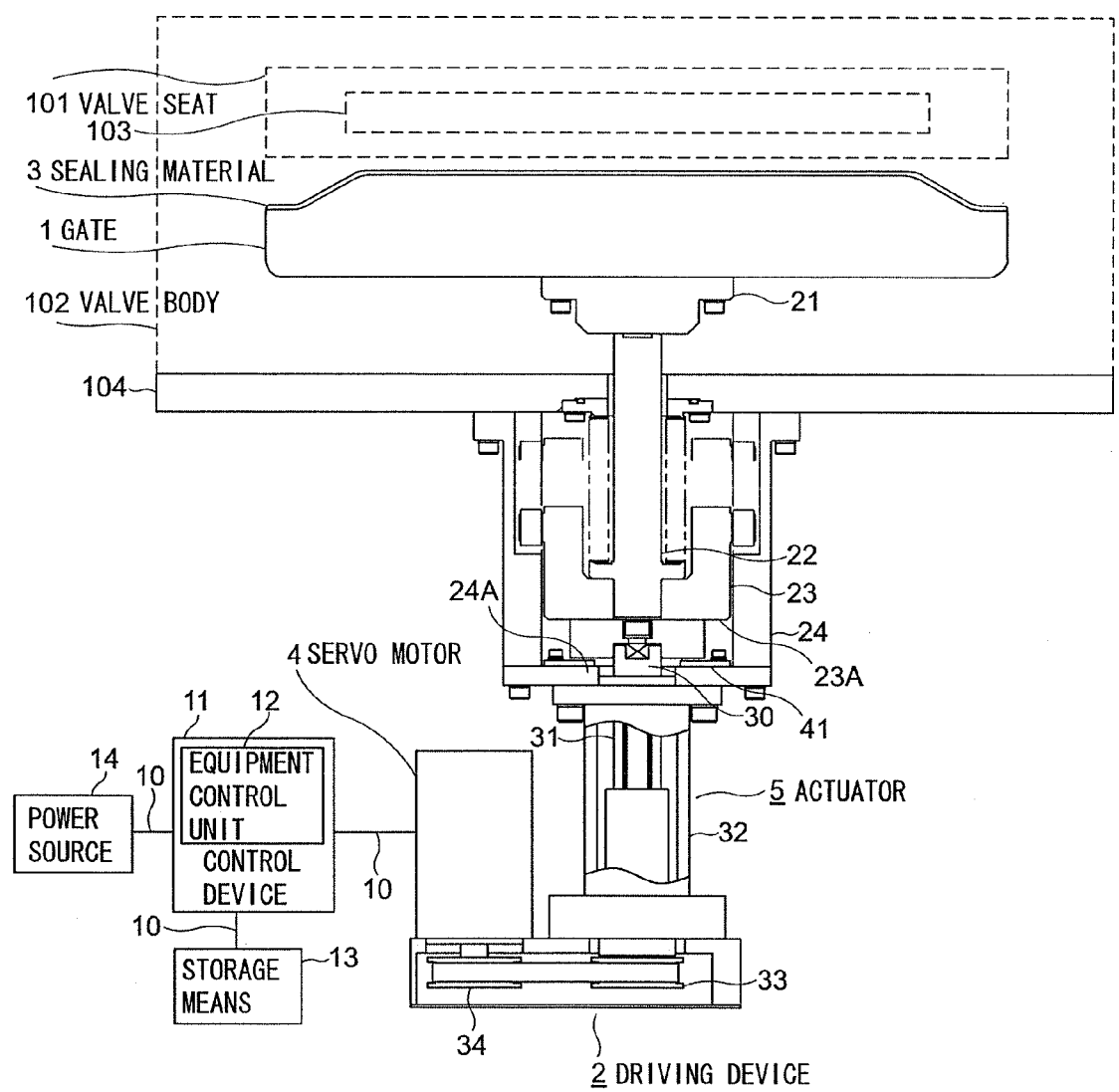
FIG. 1 This is a schematic diagram to illustrate the gate valve of an embodiment of the present invention.

The following explains a gate valve of an embodiment of the present invention referring to FIG. 1, which is a schematic diagram that illustrates the gate valve of the embodiment.

A gate valve 100 of the embodiment has a valve seat 101 and a gate 1 arranged confronting the valve seat 101. The gate 1 is driven by a driving device 2 to the valve seat 101 to press and squeeze a sealing material 3 against the valve seat 101. Being squeezed, the sealing material 3 seals gas that passes through an opening 103 on the valve seat 101.

The driving device 2 is comprised of a servo motor 4 and an actuator 5 that translates the rotative force from the servo motor 4 into a linear-motion to drive the gate 1. The actuator 5 connects to the gate 1.

The driving device 2 is connected to a control device 11 via a communication means 10. The control device 11 connects, via the communication means 10, to each of a storage means 13 and a power source 14.

The control device 11 has an equipment control unit 12. The equipment control unit 12 receives an instruction either the in-manufacturing CLOSE instruction or the FULL CLOSE instruction according to determination by an equipment such as a semiconductor manufacturing equipment and generates an in-manufacturing CLOSE position signal or a FULL CLOSE position signal referring to the in-manufacturing CLOSE position data or the FULL CLOSE position data stored in the storage means 13.

The servo motor 4 receives the in-manufacturing CLOSE position signal or the FULL CLOSE position signal and the rotative force that corresponds to the received signal is translated into the movement of the actuator 5.

The sealing material 3 is pressed against the valve seat 101 by the movement of the gate 1 caused according to the in-manufacturing CLOSE instruction or the FULL CLOSE instruction and is maintained at being squeezed state. As stated above in the gate valve 100 of the embodiment, pressing the sealing material 3 against the valve seal 101 by the motor driven gate 1, namely the sealing, causes the closing of the gate valve and parting the gate 1 from the valve seat 101 causes the opening of the gate valve. Hereinafter, these open and close movements may be referred to as a valve open/close movement or a gate valve movement where applicable.

Details of the configuration of the gate valve 100 in the embodiment are as follows.

The sealing material 3 is installed on the gate 1. The valve body connects to the top end of a shaft 22 via a stem 21 that supports the gate 1. The gate 1, the stem 21, and the top end portion of the shaft 22 are accommodated in a gate 102, a box shaped hollow casing.

On the gate 102, the valve seat 101 to which the sealing material 3 of the gate 1 is pressed is provided; on each of the valve seat 101 and the gate 102, the openings 103 are formed.

The valve body has a bottom lid 104 having a penetration hole 25. The shaft 22 passes through the penetration hole 25 so as to be movable vertically.

The bottom end of the shaft 22 connects to an inner cylinder 23 and is accommodated inside an outer cylinder 24. The top end of the outer cylinder 24 is secured on the bottom lid 104.

Between the bottom end of the shaft 22 and the lower part of the penetration hole 25, a bellows 26 is installed covering the shaft and the penetration hole 25; thereby the gas in the gate 102 is prevented from leaking into the outer cylinder 24.

The bottom end of the shaft 22 connects to the actuator 5 of the driving device 2. The actuator 5 has a ball screw mechanism 31 and a case 32 that accommodates the ball screw mechanism 31. The ball screw mechanism 31 translates the rotative force received from a rotating machine such as a motor into a linear-driving force, which is transmitted to the other element in the driving mechanism.

In the embodiment, the top end of the ball screw mechanism 31 connects to the bottom end of the shaft 22 via a coupler 30 and the bottom end of the ball screw mechanism 31 connects to one end of a rotative force transmission mechanism 33. The other end of the rotative force transmission mechanism 33 connects to the servo motor 4. The rotative force transmission mechanism 33 may be configured using a pulley mechanism 34 as shown in FIG. 1; however, a coupling device (not illustrated) may be used.

Thus, the gate valve 100 of the embodiment provides such a construction that the rotation of the servo motor 4 is transmitted to the ball screw mechanism 31 via the rotative force transmission mechanism 33 and then translated into a linear-driving force to make the gate 1 move vertically by an electric drive causing the valve open/close movement.

Since the servo motor 4 is connected to the control device 11 in the gate valve 100 of the embodiment, it becomes practicable to control the servo motor 4 by the control device 11 in high-speed, high-torque output, and high-precision positioning. Further, the controller can facilitates the monitoring of the torque, the revolution speed, etc. of the valve in operation.

The controlling of the servo motor 4 by the control device 11 enables the gate valve to make acceleration and deceleration movements for the maximum suppressing of vibration at the time of sudden start of movement to a high-speed movement, sudden stop during a high-speed movement, or contact of the sealing material of the valve to the sealing face. The rate of acceleration and deceleration can be changed freely within the motor specifications by changing the rate of acceleration through the control device 11. The environmental impact of motorized valves is less compared to conventional air-driven gate valves because of a low noise, a reduced power consumption, or other similar advantages.

Thus, the gate valve 100 of the embodiment can control the amount of squeeze of the sealing material on the valve body, because the control device 11 is able to perform the position control. In the embodiment for example, the equipment control unit 12 of the control device 11 receives an instruction either the in-manufacturing CLOSE instruction or the FULL CLOSE instruction according to determination by the equipment such as a semiconductor manufacturing equipment and generates the in-manufacturing CLOSE position signal or the FULL CLOSE position signal referring to the in-manufacturing CLOSE position data or the FULL CLOSE position data stored in the storage means 13. The servo motor 4 receives the in-manufacturing CLOSE position signal or the FULL CLOSE position signal and the rotative force that corresponds to the received signal is translated into the movement of the actuator 5. The sealing material 3 is pressed against the valve seat 101 by the movement of the gate 1 caused according to the in-manufacturing CLOSE instruction or the FULL CLOSE instruction and is maintained at being squeezed state.

The gate valve of the embodiment may be configured so as to be able to perform a working in which the equipment control unit 12 receives an instruction either the FULL OPEN instruction or the initialization instruction in addition to the in-manufacturing CLOSE instruction and the FULL CLOSE instruction and generates the in-manufacturing CLOSE position signal, the FULL CLOSE position signal, the FULL OPEN position signal, or the initialization signal referring to information stored in the storage means 13: the in-manufacturing CLOSE position, the FULL CLOSE position data, the FULL OPEN position data, or the initialization data. In such configuration, the servo motor 4 receives the in-manufacturing CLOSE position signal, FULL COLSE position signal, FULL OPEN position signal, or the initialization signal and the rotative forces that correspond to these signals are translated into the movements of the actuator 5.

In this, the gate valve 100 of the embodiment determines by calculation the travel span (stroke) from the FULL OPEN position (the place where the gate 1 will reach as its maximum travel toward its open position) to the FULL CLOSE position. This calculation of the travel distance is performed based on the initialization instruction issued by the control device 11.

In the gate valve 100 of the embodiment, the FULL OPEN position is the initial position of the gate 1; this means that the coordinate of such place corresponds to the place where an end face 23A of the inner cylinder 23 contacts with a bottom face 24A of the outer cylinder 24 as shown in FIG. 1. However, if a place that can define the initial position of the gate 1 is available, such an alternative place to the above-stated contacting place may be acceptable as the initial position stated above. This alternative initial position can be defined as the drive origin of the gate valve 100. Hereinafter, this initial position may be referred to as a drive origin where applicable.

On the bottom face 24A of the cylinder 24, a hard stopper 41 is installed. The hard stopper 41 intervenes between the end face 23A of the cylinder 23 and the bottom face 24A of the cylinder 24. Thereby, damage on the end face 23A of the cylinder 23 and the bottom face 24A of the cylinder 24 that will be caused by hitting between them is prevented.

The initial position of the gate 1 is a position where the end face 23A of the cylinder 23 is pressed at the predetermined torque on the hard stopper 41. The coordinate of the gate valve 100 at such position can be stored in the storage means 13 via the communication means device 10 as the initial position. The detection of the torque setting is performed by sensing the feedback torque of the motor torque of the servo motor 4.

FIG. 2 is a partial cross sectional view to illustrate a squeeze state of the sealing material of the gate valve of the embodiment of the present invention in the in-manufacturing CLOSE state. FIG. 3 is a partial cross sectional view to illustrate a squeeze state of the sealing material of this gate valve in the FULL CLOSE state. The embodiment has a construction that applies to a mechanism in which the shaft 22 moves vertically, that is, moves linearly. The sealing material installed on the gate 1 forms the sealing at two places on the end face of the gate 1 that contacts with the valve seat 101 to make the seal at the opening 103 assured.

FIG. 4 is a partial cross sectional view to illustrate a squeeze state of the sealing material of the gate valve in another embodiment of the present invention in the in-manufacturing CLOSE state. FIG. 5 is a partial cross sectional view to illustrate a squeeze state of the sealing material of this gate valve in the FULL CLOSE state. This example has a construction that applies to a mechanism in which the shaft 22 is moved toward the valve seat by a roll-cam mechanism (not illustrated) provided between the shaft 22 and the actuator. The sealing material installed on the gate 1 forms the sealing at two places on the end face of the gate 1 that contacts with the valve seat 101 to make the seal at the opening 103 assured.

Thus, the construction stated above can shut off the process gas migration between the gate 1 and the valve seat 101 while the gate valve is used under the condition that the equipment is in manufacturing. Further, the amount of squeezing of the sealing material 3 under the condition that the equipment is in manufacturing can be reduced compared to that of under the state in which the sealing material 3 is to maintain vacuum with the gate 1.

Since the gate valve of the embodiment has the configuration as stated above, the amount of squeeze of the sealing material 3 can be controlled by the position control of the gate 1 that the control device 11 performs. Thereby, the amounts of squeeze of the sealing material 3, one under the in-manufacturing state and the other under the state in which the sealing material 3 is to maintain vacuum with the gate 1, can be controlled at two positions: at the in-manufacturing CLOSE position and at the FULL CLOSE position.

Further, the operation of the gate valve occurs in many cases during the product manufacturing; therefore, reducing the amount of squeeze of the sealing material during the product manufacturing can lessen the deterioration of the sealing material. The following describes the sequence of process steps when the FULL CLOSE instruction or in-manufacturing CLOSE instruction is given.

Figure 6:
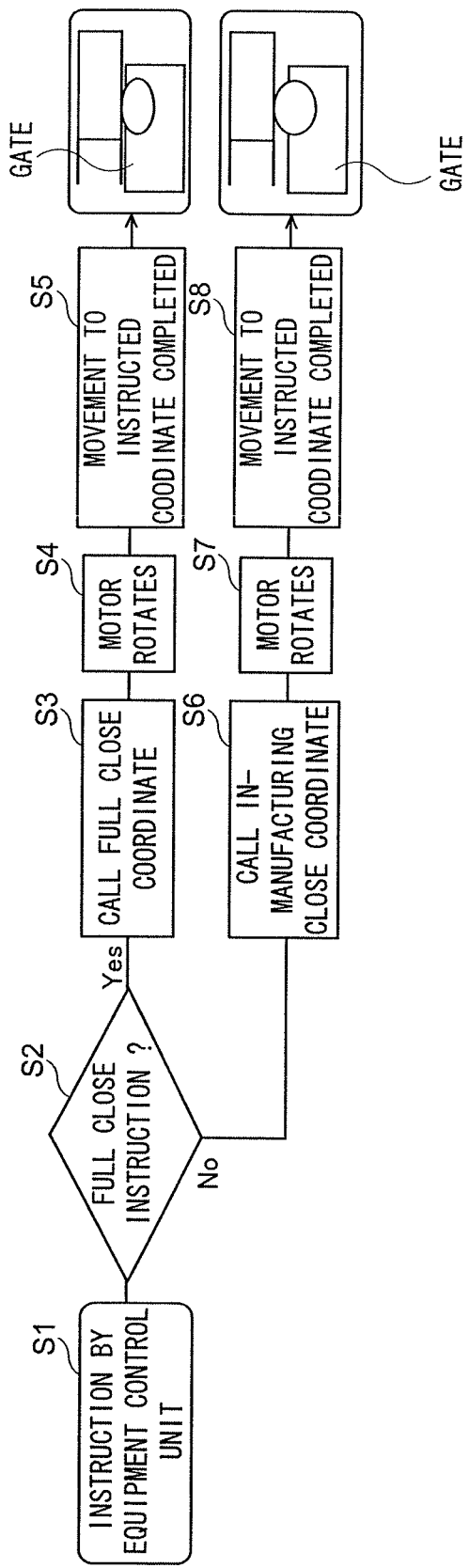
FIG. 6 This is a diagram to describe the sequence of process steps in the gate valve of an embodiment of the present invention when the FULL CLOSE instruction or in-manufacturing CLOSE instruction is given.

FIG. 6 is a diagram to describe the sequence of process steps in the gate valve of an embodiment of the present invention when the FULL CLOSE instruction or in-manufacturing CLOSE instruction given. At first, the equipment control unit 12 sends the FULL CLOSE instruction or in-manufacturing CLOSE instruction (S1). Then, it is determined whether the sent instruction is FULL CLOSE instruction (S2).

When the determination is YES; the coordinate of the FULL CLOSE position of the gate 1 stored in the storage means 13 in advance is called (S3) to generate the FULL CLOSE signal, and then the servo motor 4 rotates according to the FULL CLOSE signal (S4) to move the gate 1, and thereby the gate 1 reaches the coordinate specified by the instruction to complete its movement (S5). As a result, the amount of squeeze of the sealing material 3 on the gate 1 becomes the amount that corresponds to the FULL CLOSE state.

When the determination is NO; the coordinate of the in-manufacturing CLOSE position of the gate 1 stored in the storage means 13 in advance is called (S6) to generate the in-manufacturing CLOSE signal, and then the servo motor 4 rotates according to the in-manufacturing CLOSE signal (S7) to move the gate 1, and thereby the gate 1 reaches the coordinate specified by the instruction to complete its movement (S8). As a result, the amount of squeeze of the sealing material 3 on the gate 1 becomes the amount that corresponds to the in-manufacturing CLOSE state.

Therefore, the gate valve 100 of the embodiment is characterized in that the state of squeeze of the sealing material at a FULL CLOSE position is large in the amount of squeeze and the state of squeeze of the sealing material at an in-manufacturing CLOSE position is controlled to an amount of squeeze smaller than that in the FULL CLOSE position by the movement of the actuator in the opening direction from the FULL CLOSE position.

It should be noted that, in the gate valve of the embodiment of the present invention, when the FULL OPEN instruction is issued, the gate 1 is moved to the initial position regardless of the sequence of process steps in the FULL CLOSE instruction and in the in-manufacturing CLOSE instruction.

Further in the gate valve 100 of the embodiment, the storage means 13 can store the number of issuances of the FULL CLOSE instruction. Therefore, the number of issuances of the FULL CLOSE instruction can be easily checked by indicating the number of issuances of the FULL CLOSE instruction on a display means (not illustrated).

Thereby, whether such number has reached the pre-set number for replacement of the sealing material can be easily determined. This means that how many times the sealing material has experienced squeezing to the FULL CLOSE position can be easily known permitting the eased estimation of the degree of deterioration of the sealing material 3. As a consequence, to know in advance the timing of the sealing material replacement becomes practicable by checking the number of issuances of the FULL CLOSE instruction indicated on the display means; thereby, the sealing material currently in use can be employed without waste and moreover an interruption of the product manufacturing caused from the malfunctioning of the valve open/close movement attributable to the deterioration of the sealing material can be prevented.

Figure 7:
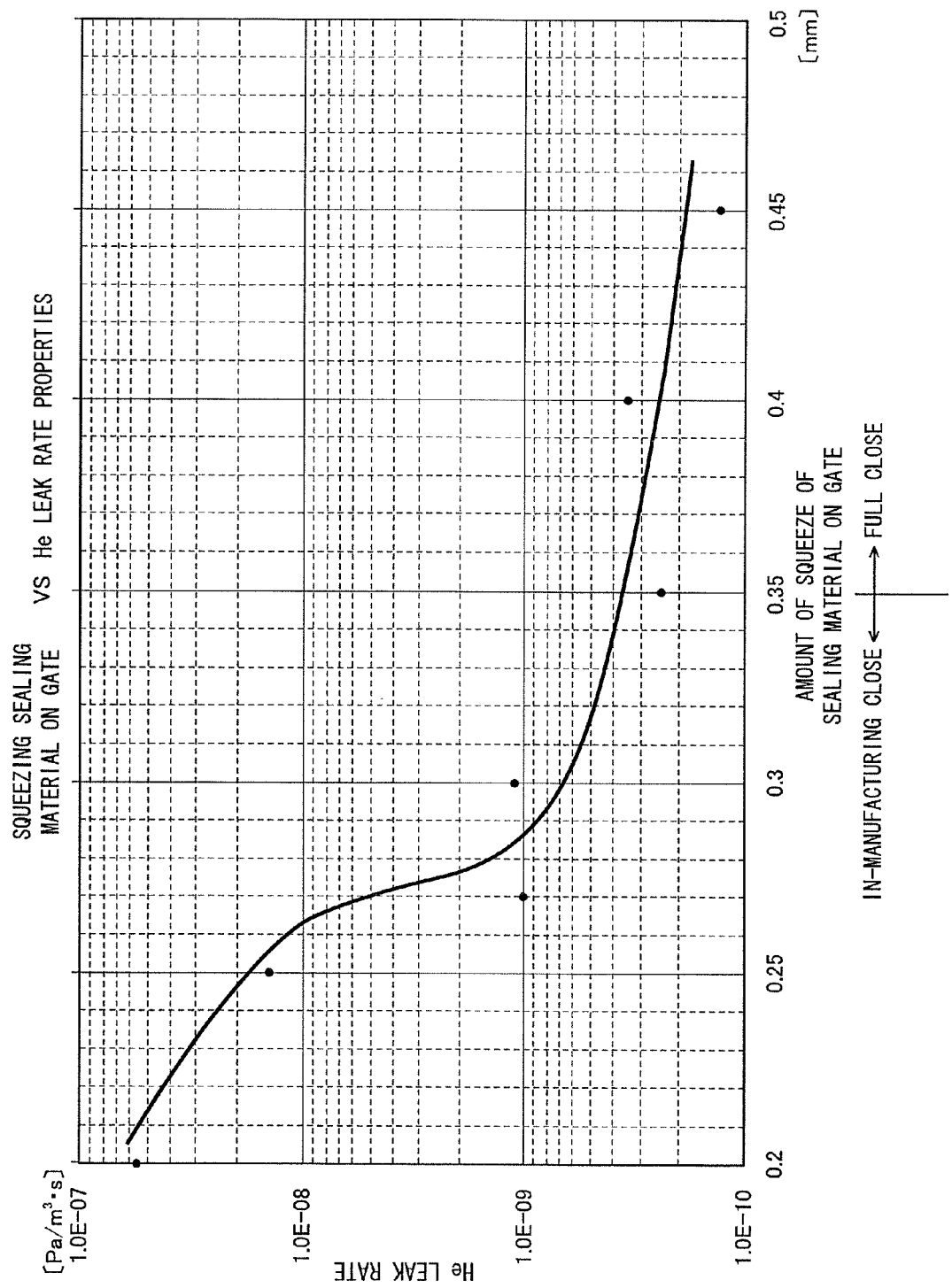
FIG. 7 This is a graph to show the relationship between the amount of squeeze of the sealing material and the Helium (He) leak rate in the gate valve of an embodiment of the present invention.

FIG. 7 is a graph to show the relationship between the amount of squeeze of the sealing material and the Helium (He) leak rate in the gate valve of an embodiment of the present invention. The graph indicates the relationship between the amount of squeeze of the sealing material 3 and the He leak rate (which is the amount of He leak rate from the interstice existing between the gate 1 and the valve seat 101 under the condition that the inside of the gate 1 is vacuum and the outside thereof is the atmosphere).

Increasing the amount of squeeze of the sealing material 3 decreases the He leak rate; however, as long as the degree of leakage satisfies the specifications, an excessive squeezing is not necessary. When the He leak rate satisfies the specifications, a less amount of squeeze of the sealing material 3 will suppress the deterioration thereof. Further, a reduced amount of squeeze lessens the torque of the servo motor 4 with the power consumption restrained. The gate valve of the embodiment has advantages stated above brought by performing the control at two positions.

As can be known from the relationship between the amount of squeeze of the sealing material and the He leak rate shown in FIG. 7, it is preferable that the amount of squeeze of the sealing material at the FULL CLOSE position is to be not less than 0.35 mm or more and at the in-manufacturing CLOSE position is to be not larger than 0.35 mm.

Further in the gate valve 100 of the embodiment, it is preferable that the amount of squeeze of the sealing material is to be 0.35 mm at the FULL CLOSE position or to be 0.25 mm at the in-manufacturing CLOSE position.

In addition, the gate valve 100 of the present invention is characterized in that the control device 11 switches the in-manufacturing CLOSE position signal to the FULL CLOSE position signal, when the instructions from the equipment control unit 12 is not received in predetermined time limit while the sealing material is pressed and maintained in the squeezed state by the movement of the gate 1 caused in response to the in-manufacturing CLOSE instruction. This switching from the in-manufacturing CLOSE position signal to the FULL close position signal is automatically performed by the control device 11.

As stated above, the operation of the gate valve occurs in many cases during the product manufacturing; therefore, the instructions from the equipment control unit 12 to the control device 11 continue in succession. Thus, the break of the instructions mostly occurs at on-error-stop during manufacturing or at maintenance. Since the gate valve 100 of the embodiment employs such a configuration as stated above on the assumption of possible occurrence of on-error-stop and in preparation for maintenance occasion, the equipment control unit 12 is able to automatically move the gate 1 to the FULL CLOSE position even if the FULL CLOSE signal is not received. The sequence of process steps of this feature is explained below.

Figure 8:
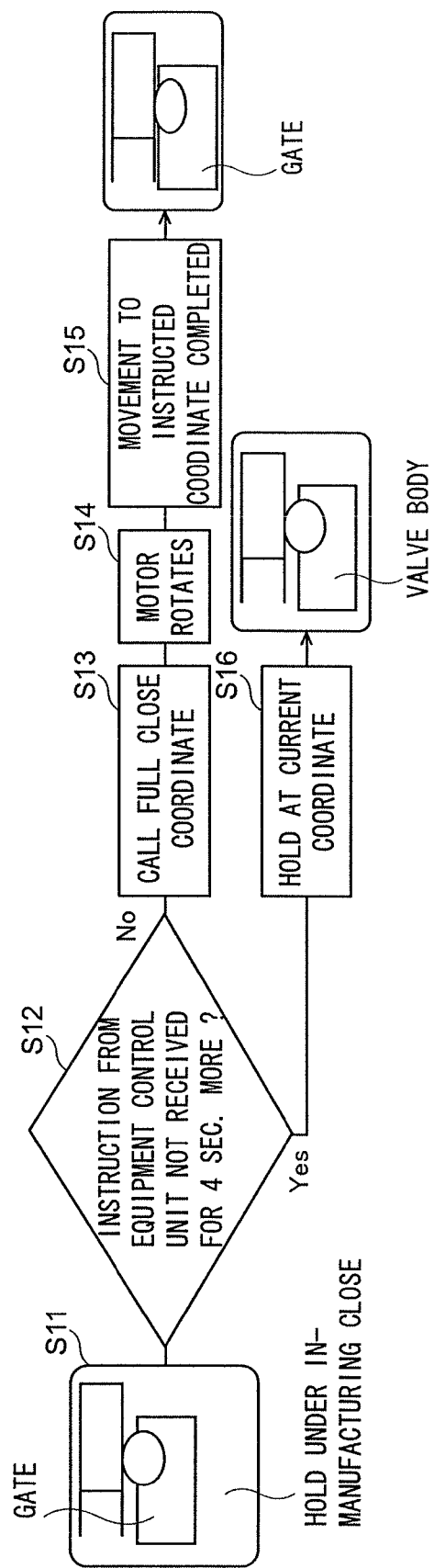
FIG. 8 This is a diagram to describe the sequence of process steps in the automatic FULL CLOSE action in the gate valve of an embodiment of the present invention.

FIG. 8 is a diagram to describe the sequence of process steps in the Automatic FULL CLOSE action in the gate valve of an embodiment of the present invention. First, when the gate 1 is held at the in-manufacturing CLOSE position (S11), the control device 11 determines whether the instruction from the equipment control unit 12 has not been received for four seconds or more (S12).

When the determination is NO; the coordinate of the FULL CLOSE position of the gate 1 stored in the storage means 13 in advance is called (S13) to generate the FULL CLOSE signal, and then the servo motor 4 rotates according to the FULL CLOSE signal (S14) to move the gate 1, and thereby the gate 1 reaches the coordinate specified by the instruction to complete its movement (S15). As a result, the amount of squeeze of the sealing material 3 on the gate 1 becomes the amount that corresponds to the FULL CLOSE state.

When the determination is YES, that is the instruction from the equipment control unit 12 has been received within four seconds, the gate 1 is held at the present coordinate of position (S16).

As stated above, the gate valve 100 of the embodiment is characterized in that the time limit for the state that the instruction from the equipment control unit is not received is set to four seconds or more. This setting is based on the fact that the maximum time lag in receiving one latest instruction is four seconds or more after the last instruction. That is, if the time lag is more than that, the situation should be judged to be in an abnormal working order, or in other intended status such as an idle state after the planned manufacturing completion or an idle state under a regular maintenance. This configuration prevents process gas from leaking from the sealing portion on the valve body of the gate valve.

It should be noted that the instructions stated above may be configured so as to include the FULL OPEN instruction and the initialization instruction in addition to the in-manufacturing CLOSE instruction and the FULL CLOSE instruction. That is, the gate valve 100 of the embodiment may be configured so as to be able to perform a working in which the control device 11 switches the in-manufacturing CLOSE position signal to the FULL CLOSE position signal, when any of the in-manufacturing CLOSE instruction, the FULL CLOSE instruction, the FULL OPEN instruction, or the initialization instruction from the equipment control unit 12 is not received in predetermined time limit while the sealing material is pressed against the valve seat 101 and maintained in the squeezed state by the movement of the gate 1 caused in response to the in-manufacturing CLOSE instruction.

Figure 9:
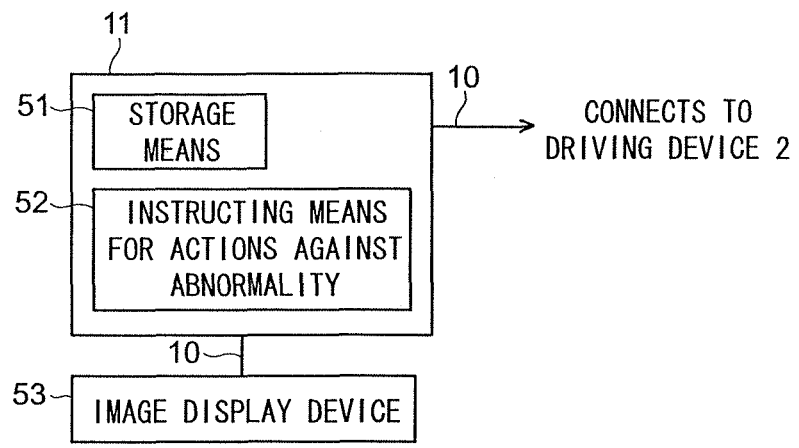
FIG. 9 This is a block diagram to describe the configuration of the control device of the gate valve of another embodiment of the present invention.

FIG. 9 is a block diagram to describe the configuration of the control device of the gate valve of another embodiment of the present invention. As FIG. 9 shows, the gate valve 100 of another embodiment of the present invention is characterized in that the control device 11 has a storage means 51 and an instructing means for actions against abnormality 52, wherein the storage means 51 stores, in advance, the time course behaviors of the feedback torque waveform and the gate valve opening waveform both at the time of the last operation of the gate valve as the feedback torque waveform (hereinafter referred to as last operation feedback torque waveforms), and the instructing means for actions against abnormality 52 compares the last operation feedback torque waveforms with a feedback torque waveform generated from the time course behaviors of the currently measured feedback waveform at the time of operation of the gate valve and the currently measured gate valve opening waveform (the generated waveform is hereinafter referred to as an on-operation feedback torque waveform in current measurement) to examine the identity of waveforms, and, when waveforms are judged not identical, the instructing means for actions against abnormality 52 reverses the rotation direction specified in the instruction of the rotation direction of the rotative force of the servo motor 4 so that the servo motor 4 will make a predetermined number of times of reverse rotation and thereafter will stop.

Figure 10:
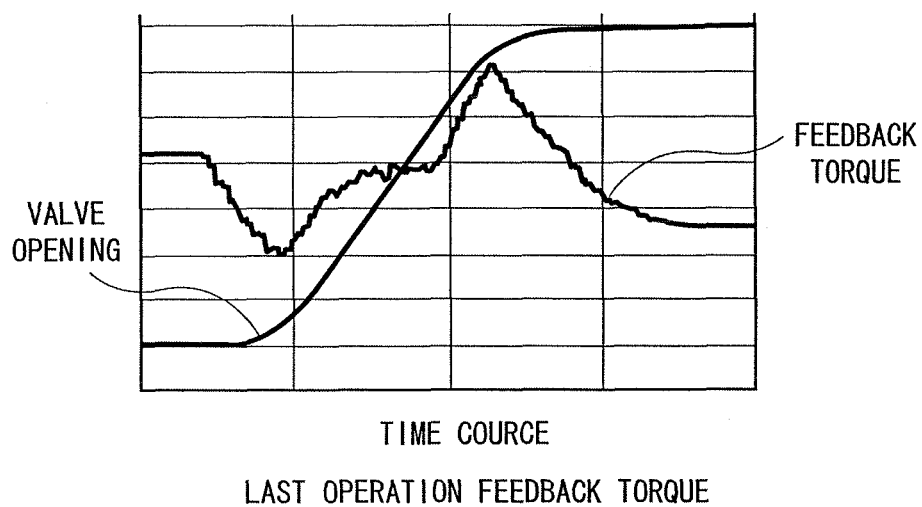
FIG. 10 This is a chart to show, in a time series waveform, the relationship between the valve opening and the feedback torque in the gate valve of an embodiment of the present invention.

FIG. 10 is a chart to show, in a time series waveform, the relationship between the valve opening and the feedback torque in the gate valve 100 of an embodiment of the present invention. Use of the servo motor 4 facilitates the monitoring of the feedback torque during usual operation. In this embodiment, the last operation feedback torque waveform as shown in FIG. 10 is stored in the storage means 51 and is compared with the on-operation feedback torque waveform in the current measurement. If the on-operation feedback torque waveform in current measurement differs from the last operation feedback torque waveform, the situation is judged to be in a state that an abnormal torque has been detected. In this event, the instructing means for actions against abnormality 52 stops the movements in the gate valve urgently and reverses the rotation direction of the servo motor 4 one turn and then releases the servo motor 4 from being under the servo-state. The following explains the sequence of process steps in this working.

Figure 11:
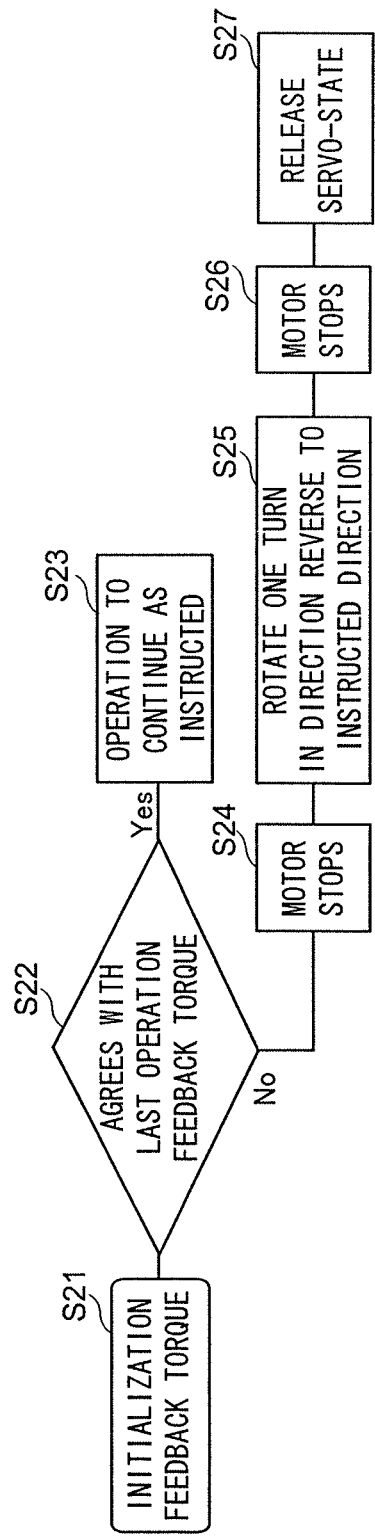
FIG. 11 This is a diagram to describe the sequence of process steps in the stoppage action against abnormal working of the gate valve illustrated in FIG. 9.

FIG. 11 is a diagram to describe the sequence of process steps in the stoppage action against abnormal working of the gate valve illustrated in FIG. 9. First, the control device 11 calls the on-operation feedback torque waveform in the current measurement that is measured and stored in the storage means 51 (S21). Then, the on-operation feedback torque waveform in the current measurement is compared with the last operation feedback torque waveform to determine whether they are identical (S22).

When the determination is YES, instructions are issued succeedingly to continue the operation of the gate valve (S23).

When the determination is NO, the servo motor 4 is stopped (S24). Then the servo motor 4 is rotated one turn in the direction reverse to the instructed direction (S25) and is stopped (S26). Thereafter the servo motor 4 is released from being under the servo-state.

With this configuration, the gate valve 100 of the embodiment automatically makes an emergency stop if, particularly, the valve body or other element in the valve collides against an element of device in the system; thereby damage of the gate valve 100 of the embodiment can be minimized.

In addition, in the gate valve 100 of the embodiment, the control device 11 may be equipped, as shown in FIG. 9, with an image display device 53 that displays the feedback torque waveform at the time of the last operation stored in the storage means 51 and the currently measured feedback torque waveform on the screen in the superimposition manner in terms of the time course.

By equipping such image display device 53, the feedback torque waveform at the time of the last operation stored in the storage means 51 and the currently measured feedback torque waveform are displayed on the screen at the time of operation of the gate valve 100 in the superimposition manner in terms of the time course, enabling a visual check. Thus, the prompt grasping of the abnormal working state of the gate valve 100 becomes practicable.

The gate valve of the present invention is characterized in that; when the control device receives a FULL OPEN initialization instruction from the equipment control unit and generates a FULL OPEN initialization signal, and the servo motor receives the FULL OPEN initialization signal, and the rotative force of the servo motor that corresponds to the received signal is translated into a movement of the actuator, and the valve body is driven to the home position of drive at a uniform speed and is pressed on the home position of drive, and the valve body so pressed is pressed at a torque more than the predetermined torque for a predetermined length of time continuously, then the position of the valve body is stored in the storage means as a FULL OPEN position data; and when the control device receives a FULL CLOSE initialization instruction from the equipment control unit and generates a FULL CLOSE initialization signal, and the servo motor receives the FULL CLOSE initialization signal, and the rotative force of the servo motor that corresponds to the received signal is translated into a movement of the actuator, and the valve body under being pressed is driven to the valve seat at a uniform speed and presses the sealing material at a torque that gives a predetermined amount of squeeze, and the sealing material under being pressed is pressed at a torque more than the torque that gives the predetermined amount of squeeze for a predetermined length of time continuously, then the position of the valve body is stored in the storage means as the FULL CLOSE position data and the position, the amount of squeeze of the sealing material at which is a prearranged less amount smaller than the predetermined amount of squeeze, is stored in the storage means as an in-manufacturing position data, and the distance from a FULL OPEN position to a FULL CLOSE position is stored in the storage means as a valve body drive amount. The procedure sequence of the steps of the work stated above is detailed below.

Figure 12:
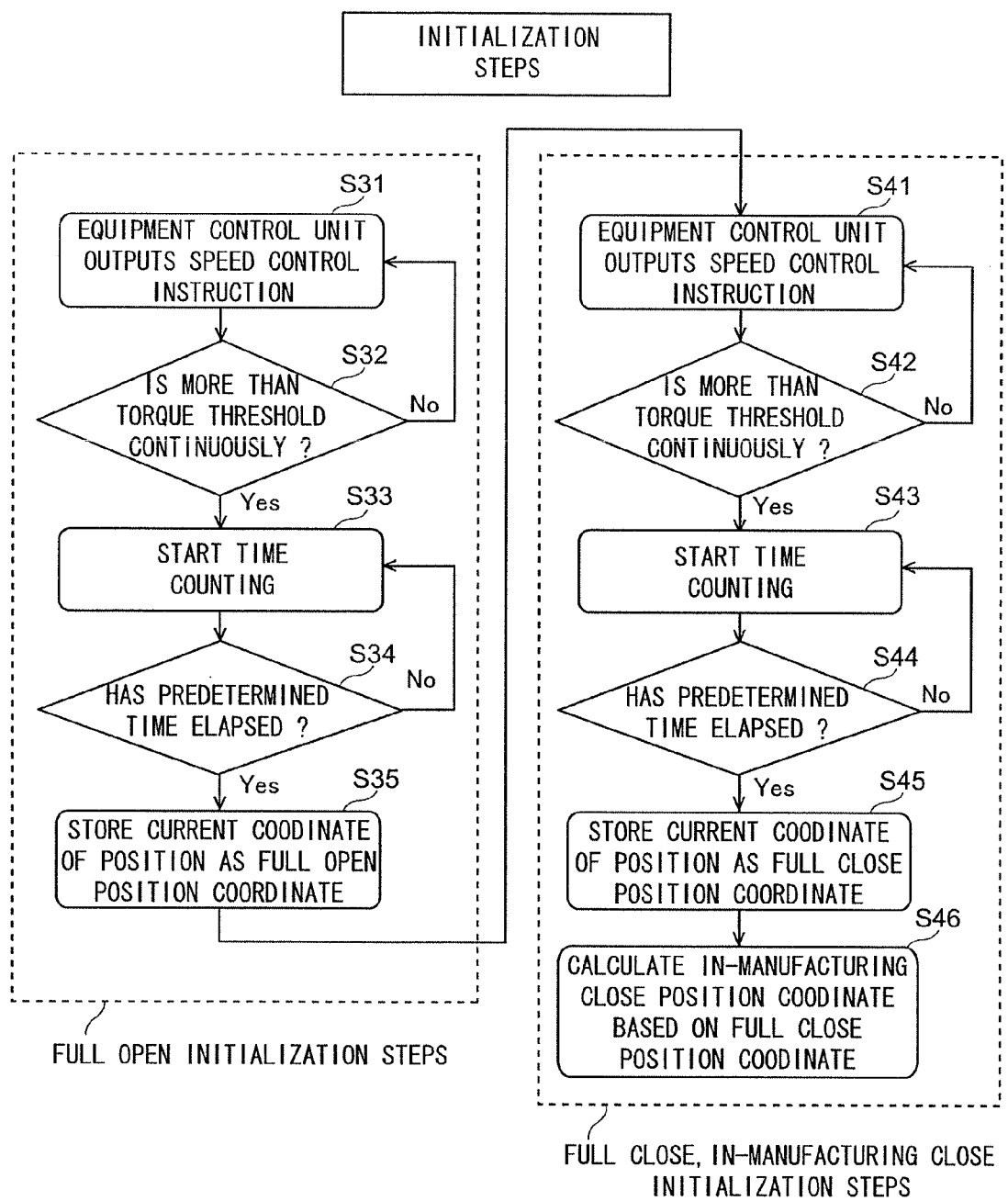
FIG. 12 This is a diagram to describe the sequence of process steps in the initialization in response to the initialization instruction in the gate valve of an embodiment.

FIG. 12 is a diagram to describe the sequence of process steps in the initialization in response to the initialization instruction in the gate valve of an embodiment. As FIG. 12 describe, the procedures in the initialization are divided into the FULL OPEN initialization step, the FULL CLOSE, and the in-manufacturing CLOSE initialization step. Any of these steps can be the starting step; further, the gate valve of the embodiment can perform an accurate initialization with less variation regardless of which step is the starting step. The following explains example procedures in the initialization.

At first, the equipment control unit 12 of the control device 11 issues the FULL OPEN initialization instruction (S31). The control device 11 receives the FULL OPEN initialization instruction and generates the FULL OPEN initialization signal. Then, the servo motor 4 receives the FULL OPEN initialization signal and the rotative force of the servo motor 4 that corresponds to the signal is translated into the movement of the actuator 5. Following that, the gate 1 is driven to the home position of drive (for example, the place where an end face 23A of the cylinder 23 contacts with a bottom face 24A of the cylinder 24 contact) at a uniform speed and is pressed thereto. Driving the gate 1 at a uniform speed prevents fluctuation in the positioning to the FULL OPEN position that is attributable to the variation of the speed.

Next, when the gate 1 is pressed at a torque more than the predetermined torque for a predetermined length of time continuously, the position of the valve body is stored in the storage means as the FULL OPEN position data. In detail, whether the gate 1 is in the state being pressed at a torque more than the predetermined torque (a torque threshold) continuously is determined by calculation applied over the detected feedback torque (S32). When the determination is NO, the process step returns to the step S31; when YES, the timer starts time counting (S33).

After that, the control device 11 measures whether the time from the start of the time counting has reached the predetermined time lapse (S34). In this measurement, when the feedback torque becomes lower than the predetermined torque threshold before the time count reaches the predetermined time count limit, the determination is NO and the time counting re-starts from zero count.

On the other hand, when the torque maintains being more than the torque threshold for the time beyond the predetermined time count limit, the determination is YES, and then the coordinate of the present position of the gate 1 is stored in the storage means 13 as the FULL OPEN position data (S35). It is preferable that the torque threshold is to be 40% of a 100% torque, wherein the 100% torque is a torque with which the gate 1 is deemed definitely in the initial position. The settings for these aspects are stored in the storage means 13 in advance. It is also a preferable predetermination that the limit of time count is to be one second or more. Thus, the steps in the FULL OPEN initialization completes.

Next, the equipment control unit 12 of the control device 11 issues the FULL CLOSE initialization instruction (S41). The control device 11 receives this FULL CLOSE initialization instruction and generates the FULL CLOSE initialization signal. Then, the servo motor 4 receives the FULL CLOSE initialization signal, and the rotative force of the servo motor 4 that corresponds to the received signal is translated into a movement of the actuator 5. Following this, the gate 1 under being pressed is driven toward the valve seat at a uniform speed and presses the sealing material 3 at a torque that gives a predetermined amount of squeeze. Driving the gate 1 at a uniform speed prevents fluctuation in the positioning to the FULL OPEN position that is attributable to the variation of the speed.

When the sealing material 3 under being pressed is pressed at a torque more than the torque that gives the predetermined amount of squeeze for a predetermined length of time continuously, the position of the gate 1 is stored in the storage means 13 as the FULL CLOSE position data. In detail, whether the sealing material 3 in the state being pressed is under a torque more than the predetermined torque (a torque threshold) continuously, that is, whether the sealing material 3 in the state being pressed is in the squeezed state of which amount is more than the predetermined amount continuously, is determined by calculation applied over the detected feedback torque (S42). When the determination is NO, the process step returns to the step S41; when YES, the timer starts time counting (S43).

After that, the control device 11 measures whether the time from the start of the time counting has reached the predetermined time lapse (S44). In this measurement, when the feedback torque becomes lower than the predetermined torque threshold before the time count reaches the predetermined time count limit, the determination is NO and the time counting re-starts from zero count.

On the other hand, when the torque maintains being more than the torque threshold for the time beyond the predetermined time count limit, the determination is YES, and then the coordinate of the present position of the gate 1 is stored in the storage means 13 as the FULL CLOSE position data (S45). It is preferable that the torque threshold is to be such a torque as gives the amount of squeeze of 0.35 mm to the sealing material 3. The settings for these aspects are stored in the storage means 13 in advance. It is also a preferable predetermination that the limit of time count is to be three seconds or more.

Next, the position, the amount of squeeze of the sealing material 3 at which is a prearranged less amount smaller than the predetermined amount of squeeze, that is, the place where the sealing material 3 is under the torque smaller than the torque threshold, is calculated by the control device 11 (S46). Then, the calculation is stored in the storage means 13 as the in-manufacturing CLOSE position data. It is preferable that the torque threshold is to be such a torque as gives the amount of squeeze of 0.35 mm to the sealing material 3. Thus, the steps in the FULL CLOSE initialization completes.

The distance from the FULL OPEN position to the FULL CLOSE position is stored in the storage means 13 as the drive reach (distance of stroke) of the gate 1. That is, the travel span (stroke) from the FULL OPEN position (the place where the gate 1 will reach as its maximum travel toward its open position) to the FULL CLOSE position is calculated and stored in the storage means 13. The gate valve 100 of the embodiment thus finishes its initialization works by completing the FULL OPEN initialization steps, the FULL CLOSE, and the in-manufacturing initialization steps stated above.

The conventional initialization practice used limit switches, photo-micro-sensors, or other similar devices arranged in the vicinity of the stroke end of a valve body and performed positioning based on signals generated from such devices. This means that the positioning in the conventional practice was relied on fixed positions and consequently the sealing performance had variation. In the gate valve of the embodiment of the present invention, the FULL CLOSE position can be determined and set even if there are individual difference of each of valves, because the initialization in the invented gate valve is performed in the above-stated manner.

Therefore, a gate valve having less variation in sealing performance and having an economical sensor-less feature can be provided.

Further in the gate valve of the embodiment of the present invention configured as stated above, the amount of squeeze of the sealing material is controlled separately for each of the situations: the in-manufacturing state and the vacuum maintaining state. Therefore, a gate valve, in which the deterioration of the sealing materials is suppressed and the service life thereof can be extended, can be provided.

It however should be noted that the implementation of the gate valve of the present invention is not limited to the gate valves having a configuration stated above embodiments and that another configuration may be employed within the extent of effects that the configuration in the above-stated embodiments will provide.

In addition, the gate valve of the embodiment of the present invention is applicable to semiconductor manufacturing equipment, liquid crystal manufacturing equipment, organic EL manufacturing equipment, solar-cell manufacturing equipment, and hard disk manufacturing equipment; and further to the other similar manufacturing equipment.

REFERENCE SIGN LIST

1 . . . Valve body
2 . . . Driving device
3 . . . Sealing material
4 . . . Servo motor
5 . . . Actuator
11 . . . Control device
12 . . . Equipment control unit
14 . . . Storage means
100 . . . Gate valve
101 . . . Valve seat

The invention claimed is:

1. A gate valve comprising:
a valve seat,
a valve body arranged confronting said valve seat,
a sealing material,
a driving device that drives said valve body to said valve seat to press said sealing material against said valve seat so that said sealing material will be squeezed to establish sealing, and
a control device connected to said driving device, wherein,
with respect to said gate valve, said driving device is comprised of a servo motor and an actuator connected to said valve body to drive said valve body by applying linear-motion force generated by translating rotative force from said servo motor,
said control device is comprised of an equipment control unit that transmits an instruction that is either an in-manufacturing CLOSE instruction or a FULL CLOSE instruction according to determination by related manufacturing equipment,
movement of the actuator is controlled so that a squeeze amount in a first squeezed state of said sealing material at a FULL CLOSE position is larger than the squeeze amount in a second squeezed state of said sealing material at an in-manufacturing CLOSE position by movement of the actuator in an opening direction from said FULL CLOSE position, and
a storage means that stores in advance a graphical relationship, in a graph, of CLOSE position data obtained from squeezing of the sealing material and gas leak amount data relating to any gas leak from between the sealing material and the valve seat,
said control device receives either said in-manufacturing CLOSE instruction or said FULL CLOSE instruction, according to the determination by said related manufacturing equipment, from said equipment control unit, and generates an in-manufacturing CLOSE position signal or a FULL CLOSE position signal by referring to said graphical relationship of the CLOSE position data and the gas leak amount data stored in said storage means,
said servo motor receives said in-manufacturing CLOSE position signal or said FULL CLOSE position signal, and the rotative force of from said servo motor, which corresponds to the signal received by the servo motor, is translated into the movement of said actuator, and
said sealing material is pressed against said valve seat by movement of said valve body caused according to said in-manufacturing CLOSE instruction or said FULL CLOSE instruction and is maintained being in a squeezed condition.

2. The gate valve according to claim 1, wherein
when said control device receives a FULL OPEN initialization instruction from said equipment control unit and generates a FULL OPEN initialization signal, and said servo motor receives said FULL OPEN initialization signal, the rotative force from said servo motor corresponds to the FULL OPEN initialization signal and is translated into the movement of said actuator, and said valve body is driven to a home position at a uniform speed and is pressed, at the home position, at a torque that is more than a predetermined torque for a predetermined length of time continuously, the home position of said valve body is stored in said storage means as FULL OPEN position data; and
when said control device receives a FULL CLOSE initialization instruction from said equipment control unit and generates a FULL CLOSE initialization signal by referring to said graphical relationship of the CLOSE position data and the gas leak amount data stored in said storage means, said servo motor receives said FULL CLOSE initialization signal, the rotative force from said servo motor corresponds to the FULL CLOSE initialization signal and is translated into the movement of said actuator, said valve body is driven to said valve seat at a uniform speed and presses said sealing material at a certain torque giving a predetermined degree of squeeze, and said sealing material is pressed at a torque greater than the certain torque the predetermined degree of squeeze for a predetermined length of time continuously, the position of said valve body is stored in said storage means as said gas leak amount data, a position and a squeeze amount of the sealing material at a prearranged amount smaller than the predetermined degree of squeeze are stored in said storage means as in-manufacturing CLOSE position data, and the distance from a FULL OPEN position to said FULL CLOSE position is stored in said storage means as a drive amount of said valve body.

3. The gate valve according to claim 2, wherein the squeeze amount at said FULL CLOSE position is not less than 0.35 mm and the squeeze amount at said in-manufacturing CLOSE position is not larger than 0.35 mm.

4. The gate valve according to claim 1, wherein the squeeze amount at said FULL CLOSE position is not less than 0.35 mm and the squeeze amount at said in-manufacturing CLOSE position is not larger than 0.35 mm.

5. The gate valve according to claim 4, wherein the squeeze amount at said FULL CLOSE position is 0.35 mm.

6. The gate valve according to claim 4, wherein the squeeze amount at said in-manufacturing CLOSE position is 0.25 mm.

7. A gate valve comprising:
a valve seat,
a valve body arranged confronting said valve seat,
a sealing material,
a driving device that drives said valve body to said valve seat to press said sealing material against said valve seat so that said sealing material will be squeezed to establish sealing, and
a control device connected to said driving device, wherein,
with respect to said gate valve, said driving device is comprised of a servo motor and an actuator connected to said valve body to drive said valve body by applying linear-motion force generated by translating rotative force from said servo motor,
said control device is comprised of an equipment control unit that transmits an instruction that is either an in-manufacturing CLOSE instruction or a FULL CLOSE instruction according to determination by related manufacturing equipment, and
a storage means that stores in advance a graphical relationship, in a graph, of CLOSE position data obtained from squeezing of the sealing material and gas leak amount data relating to any gas leak from between the sealing material and the valve seat,
said control device receives either said in-manufacturing CLOSE instruction or said FULL CLOSE instruction, according to the determination by said related manufacturing equipment, from said equipment control unit, and generates an in-manufacturing CLOSE position signal or a FULL CLOSE position signal by referring to said graphical relationship of the CLOSE position data and the gas leak amount data stored in said storage means,
said servo motor receives said in-manufacturing CLOSE position signal or said FULL CLOSE position signal, and the rotative force of from said servo motor, which corresponds to the signal received by the servo motor, is translated into the movement of said actuator,
said sealing material is pressed against said valve seat by movement of said valve body caused according to said in-manufacturing CLOSE instruction or said FULL CLOSE instruction and is maintained in a squeezed condition, and
said control device switches to said FULL CLOSE position signal when any instructions from said equipment control unit are not received within a predetermined time limit, during which said sealing material is pressed against said valve seat and maintained in the squeezed condition by movement of said valve body caused in response to the in-manufacturing CLOSE position instruction.

8. The gate valve according to claim 7, wherein the predetermined time limit when no instructions are received from said equipment control unit is four seconds or more.

9. A gate valve comprising:
a valve seat,
a valve body arranged confronting said valve seat,
a sealing material,
a driving device that drives said valve body to said valve seat to press said sealing material against said valve seat so that said sealing material will be squeezed to establish sealing, and
a control device connected to said driving device, wherein,
with respect to said gate valve, said driving device is comprised of a servo motor and an actuator connected to said valve body to drive said valve body by applying linear-motion force generated by translating rotative force from said servo motor,
said control device is comprised of an equipment control unit that transmits an instruction that is either an in-manufacturing CLOSE instruction or a FULL CLOSE instruction according to determination by related manufacturing equipment, and
a storage means that stores in advance a graphical relationship, in a graph, of CLOSE position data obtained from squeezing of the sealing material and gas leak amount data relating to any gas leak from between the sealing material and the valve seat,
said control device receives either said in-manufacturing CLOSE instruction or said FULL CLOSE instruction, according to the determination by said related manufacturing equipment, from said equipment control unit, and generates an in-manufacturing CLOSE position signal or a FULL CLOSE position signal by referring to said graphical relationship of the CLOSE position data and the gas leak amount data stored in said storage means,
said servo motor receives said in-manufacturing CLOSE position signal or said FULL CLOSE position signal, and the rotative force of from said servo motor, which corresponds to the signal received by the servo motor, is translated into the movement of said actuator,
said sealing material is pressed against said valve seat by movement of said valve body caused according to said in-manufacturing CLOSE instruction or said FULL CLOSE instruction and is maintained in a squeezed condition,
said control device has an instructing means for actions against abnormality,
said storage means stores, in advance, a time course behavior of a feedback torque waveform and a gate valve opening waveform both at a time of a last operation of said gate valve as last operation feedback torque waveforms,
said instructing means compares said feedback torque waveform searched by said time course behavior of said last operation feedback torque waveforms and said gate valve opening waveform at the time of the last operation of said gate valve with an on operation feedback torque waveform generated from a time course behavior of a currently measured feedback torque waveform at the time of operation of said gate valve and a currently measured gate valve opening waveform to examine waveform identities, and,
when waveforms are judged not identical, said instructing means for actions against abnormality reverses a rotational direction instruction for the rotative force of said servo motor so that said servo motor will make a predetermined number of reverse rotations and thereafter will stop thereafter.

10. The gate valve according to claim 9, wherein said control device has an image display device that displays said feedback torque waveform at the time of the last operation stored in said storage means and superimposed, relative to time course, with said currently measured feedback torque waveform on a screen.

* * * * *